Aug. 24, 1954

J. P. MALEC 2,687,120

MOISTURE INJECTION SYSTEM

Filed Aug. 26, 1950

Jerry P. Malec INVENTOR.

BY Arthur H. Sturges
Attorney

Aug. 24, 1954 J. P. MALEC 2,687,120
MOISTURE INJECTION SYSTEM
Filed Aug. 26, 1950 3 Sheets-Sheet 2
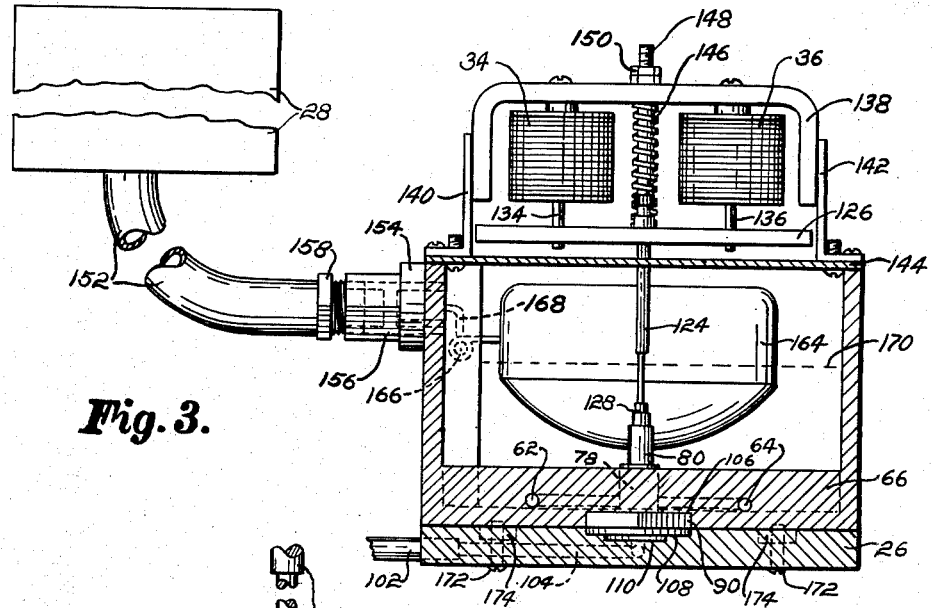
Fig. 3.
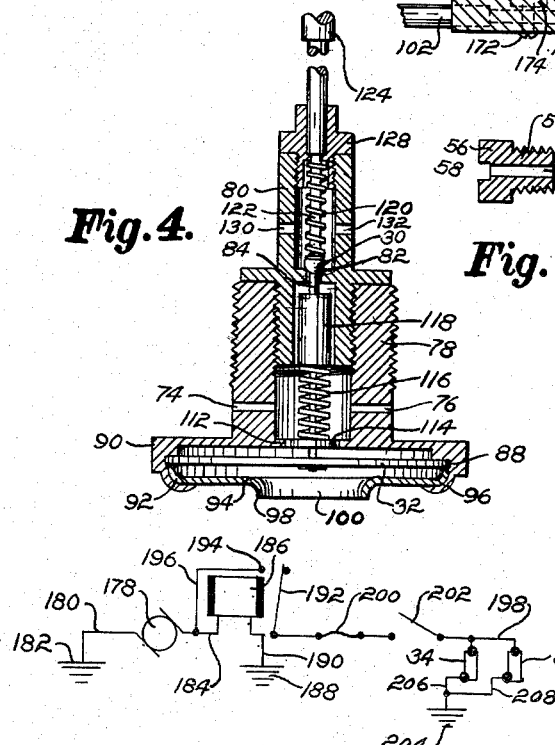
Fig. 4.
Fig. 7.
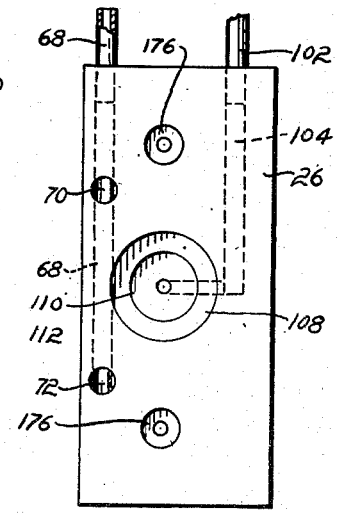
Fig. 6.
Fig. 5.
Jerry P. Malec INVENTOR.
BY Arthur H. Sturges
Attorney Patented Aug. 24, 1954

2,687,120

UNITED STATES PATENT OFFICE 2,687,120

MOISTURE INJECTION SYSTEM

Jerry P. Malec, Omaha, Nebr.

Application August 26, 1950, Serial No. 181,657

4 Claims. (Cl. 123—25)

This invention relates to fuel injection systems of internal combustion engines and particularly motor vehicle engines, and in particular an improved method of injecting an admixture of air and water into the fuel stream passing into the intake manifold of an engine wherein the said admixture of air and water is injected only with the engine running at high speeds and when the generator of the engine is generating sufficient current to open solenoid actuated valves.

The purpose of this invention is to provide control means for air and moisture injection devices of internal combustion engines wherein both the vacuum and electrical energy generated by the generator of the engine coact to control the said injection so that the moisture is not injected while the engine is idling and is only injected when the engine is under load or at high speed.

Numerous methods and various types of devices have been used for conserving the operating fuel of internal combustion engines particularly by introducing auxiliary air and atomized water into the cylinders of an engine. However, these devices have decreased rather than increased the efficiency of the engines as the water is injected while the engine is idling, and the high vacuum of idling speeds of the engine draws in more moisture than the engine can conveniently handle. With this thought in mind this invention contemplates an improved method of introducing additional air and moisture into the fuel passing into the intake manifold of internal combustion engines wherein the volume is synchronized with the voltage output of the generator of the engine so that the volume is at the maximum at high speeds of the engine and at the minimum when the engine is idling.

The object of this invention is, therefore, to provide means for injecting moisture into fuel of internal combustion engines as the fuel passes into the intake manifold of the engine by which the moisture is injected only with the engine operating under load and at high speeds.

Another object of the invention is to provide an air and water injection system for internal combustion engines that is actuated by the generator current whereby the system functions only when a predetermined voltage is generated.

Another object of the invention is to provide means for controlling an air and moisture injection system of internal combustion engines which prevents undue accumulation of carbon in the cylinder and other parts of the engine.

A further object of the invention is to provide means for injecting added air and moisture into the fuel intake of internal combustion engines whereby the injection is synchronized with the speed of the engine and proportioned in relation to the fuel so that, what is commonly known as detonation, is substantially eliminated.

A still further object of the invention is to provide an air and water mixture injection device for fuel of internal combustion engines wherein the parts are cooperatively arranged and the functions thereof synchronized to rapidly atomize the water and reduce fuel consumption which is of a simple and economical construction.

With these and other objects and advantages in view the invention embodies a plate positioned between the flanges of the carburetor and intake manifold of an engine with nozzles extended from a mixing chamber into openings therethrough, and a combination vacuum and solenoid actuated valve for controlling the water supplied to the mixing chamber from a storage tank and also the air passing into the mixing chamber.

Other features and advantages of the invention will appear from the following description taken in connection with the drawings, wherein:

Figure 3 is a cross section taken on line 3—3 of Figure 1 showing the float chamber in the tank and also showing the water storage container with part thereof broken away.

Figure 4 is a vertical section, on an enlarged scale, through the control valve.

Figure 5 is a view showing a wiring diagram illustrating the connections to the solenoids and generator.

Figure 6 is a plan view of a control plate positioned on the bottom of the tank.

Figure 7 is a detail showing a longitudinal section through one of the regulating screws used in combination with the mixing chamber.

Figure 1:
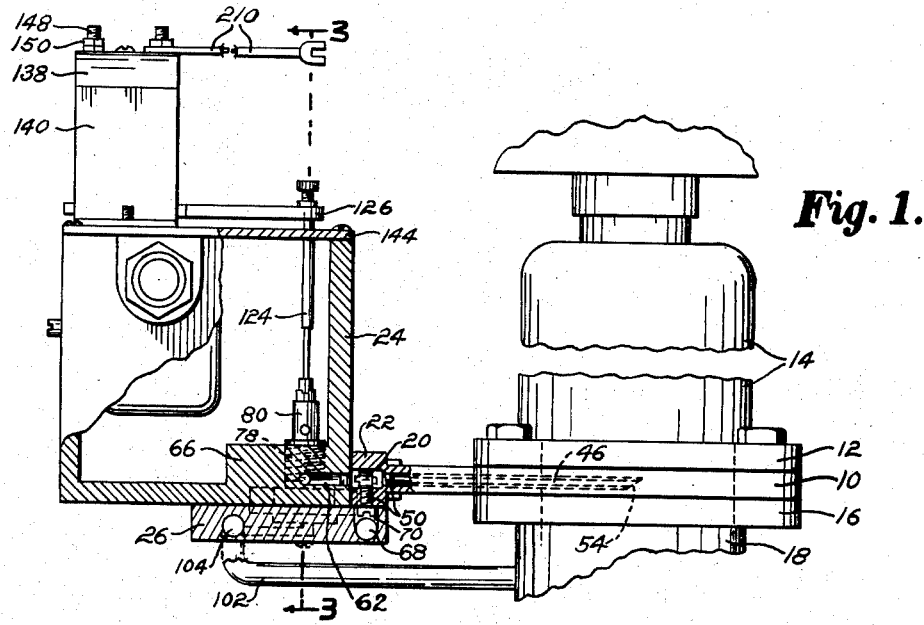
Figure 1 is a side elevational view taken substantially on line 1—1 of Figure 2, with part of the end of the tank broken away and shown in section and with the nozzle mounting plate shown between the flanges of the carburetor and intake manifold.

Referring now to the drawings wherein like reference characters denote corresponding parts the improved air and moisture injection system of this invention includes a plate 10 shaped to correspond with a flange 12 of a carburetor 14 and a flange 16 of an intake manifold 18, a mixing chamber 20 in a flange 22 on the edge of the plate 10, a mixing tank 24 having a control plate 26 on the lower end, a water storage tank 28, and a control valve 30 actuated by a diaphragm 32 and solenoids 34 and 36.

The plate 10 is provided with bolt holes 38 in the corners and openings 40 and 42 in the intermediate part that are positioned to register with openings of the flanges of the carburetor and intake manifold.

In the design shown the plate 10 is provided with two openings, as indicated by the numerals 40 and 42, so that it is adapted for use with a twin carburetor engine, and it will be understood that the system may also be used for an engine having a single carburetor wherein the plate would be provided with a single opening.

Figure 8:
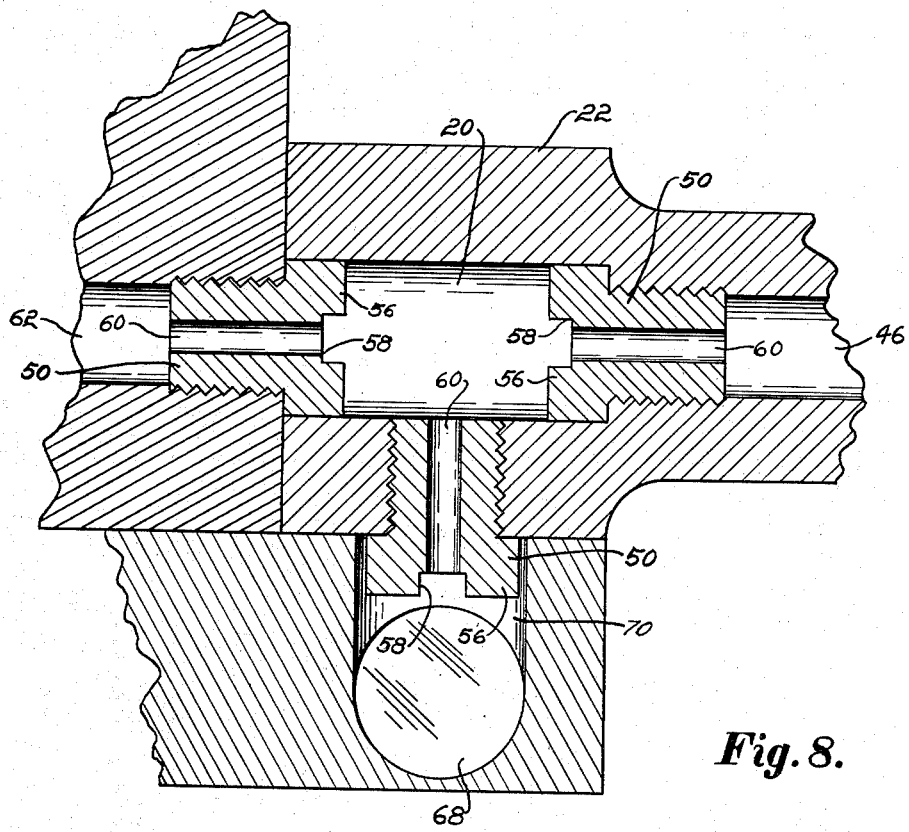
Figure 8 is a longitudinal section through the mixing chamber, on an enlarged scale, and with parts broken away.

With the twin carburetor type an additional mixing chamber 44 is provided in the flange 22, and as the mixing chambers are similar the same reference characters are used for the parts thereof as shown in Figure 8, in which the mixing chamber is indicated by the numeral 20. The mixing chambers are provided with passages 46 and 48 each having a regulating screw plug 50 threaded in the inner end and a tube 52 extended therefrom with the tubes extended into the openings 40 and 42. The ends of the tubes 52 are provided with beveled under surfaces 54, forming nozzles.

The regulating screw plugs 50 are formed with heads 56 having screw driver slots 58 therein, and bores 60 extend from the slots through the threaded shanks of the screws.

The mixing chambers 20 and 44 are supplied with water through passages 62 and 64 in the thick portion 66 of the base of the tank 24, and with air from the atmosphere through a passage 68 in the control plate 26 which is connected to the mixing chambers through connections 70 and 72. The connections 70 and 72 are also provided with regulating screw plugs 50 which are threaded into the lower edge of the flange 22.

The passages 62 and 64 are positioned to register with openings 74 and 76 in a bushing 78 of the valve body 80 of the control valve 30, the bushing being threaded into the part 66 of the tank 24 with the valve extended upwardly into the tank. The ball valve 30, which is positioned to coact with a valve seat 82 of the valve body, is unseated by a rod 84 which extends upwardly through the bushing 78 from the diaphragm 32 to which the lower end of the rod is connected. The diaphragm 32 is secured in an annular recess 88 in a rectangular-shape flange 90 by an arcuate flange 92 of a washer 94 and the washer is held by fingers 96 which are peaned over, as shown in Figure 4. The washer is provided with an outwardly flared flange 98 which provides an opening 100 through which vacuum is applied to the underside of the diaphragm through a tube 102 which is threaded into the end of a passage 104 in the control plate 26 and extends to the intake manifold of the engine. As shown in Figure 3, the flange 90 is positioned in a recess 106 in the bottom of the tank 24, and the washer 94 extends into a recess 108 in the plate 26. The recess 108 is provided with a counterbore 110 in which the fingers 96 are positioned.

The valve rod 84 extends through a web 112 having perforations 114 therein in the lower end of the bushing 78 and a spring 116 on the rod is positioned between the web and the lower ends of fins 118 on the upper part of the rod whereby the rod is returned to the position shown when vacuum pressure is relieved. The ball is held against the seat by an upper spring 120 on a reduced end 122 of an upwardly extended rod 124 which is connected to an armature 126 positioned below the solenoids 34 and 36, and this rod is raised only when sufficient current is supplied to the solenoids by the generator of the engine to raise the armature. The valve body 80 is provided with a nut 128 which is threaded in the upper end and openings 130 and 132 are provided through the wall thereof.

The armature 126 is suspended from the solenoids by guide rods 134 and 136 and the solenoids are supported by a yoke 138, the ends of which are mounted by brackets 140 and 142 on a cover plate 144 of the tank 24. The armature is resiliently held downwardly by a spring 146 on a bolt 148 which is mounted in the yoke by lock nuts 150.

Figure 2:
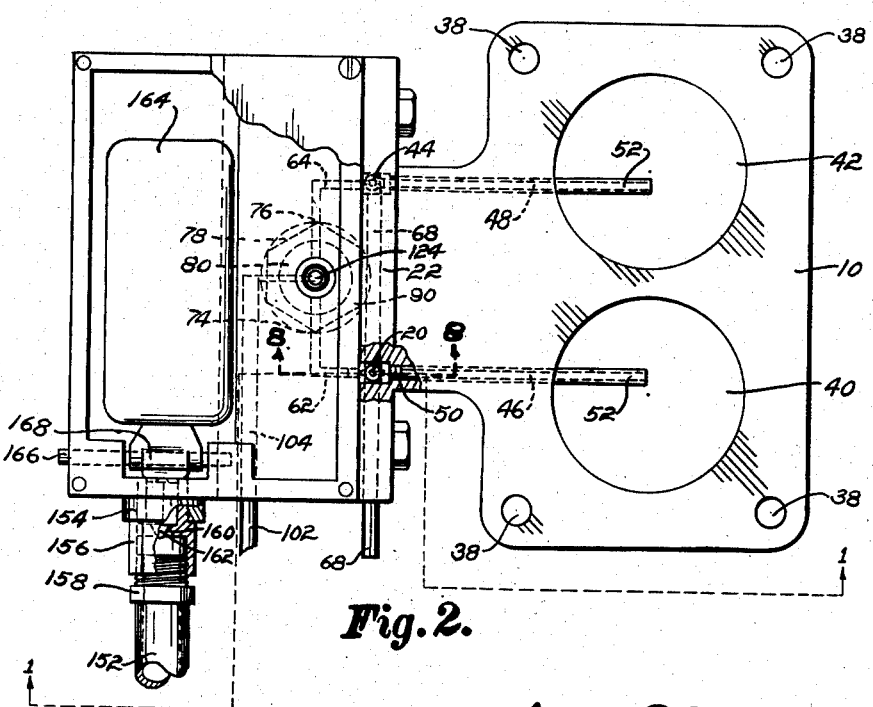
Figure 2 is a plan view showing the plate and tank with parts broken away.

Water is supplied to the tank 24 from the storage container 28 through a tube 152, the lower end of which is connected to a boss 154 on the tank 24 by a coupling 156 with a packing gland 158 in the outer end and the coupling is formed with a valve seat 160 that coacts with a float controlled valve 162, as shown in Figure 2. The valve is controlled by a float 164, pivotally mounted by a screw 166 and connected to the valve by an arm 168. By this means the water level in the tank 24 is retained at the point 170 so that it covers the openings 130 and 132 continuously.

The control plate 26 is secured to the bottom of the tank 24 by screws 172 which are threaded into bosses 174 on the bottom of the tank and the bosses are positioned in recesses 176 in the plate.

In the wiring diagram shown in Figure 5, the generator 178 of the engine is connected, at one side, by a wire 180 to a ground 182, and the other side or terminal is connected by a wire 184 to a relay 186, the opposite terminal of which is connected to a ground 188 by a wire 190. A contact arm 192 is positioned to be influenced by the relay when the generator supplies sufficient voltage, to engage a contact 194 which is connected to the wire 184 by a wire 196. The contact arm 192 is connected to the solenoids 34 and 36 by a wire 198, which is provided with a fuse 200 and a switch 202, and the opposite terminals of the solenoids are connected to a ground 204 by wires 206 and 208.

With the parts arranged in this manner the plate 10 is mounted between the flanges 12 and 16 and the tube 102 connected to the intake manifold of the engine. Water is placed in the storage container 28 and supplied to the tank 24 by means of the float, as required. With the engine idling the circuit is not completed to the solenoids 34 and 36 and the spring 146 holds the armature 126 downward with the rod 124 holding the ball 30 on the seat so that water is not passing through the openings 130 and 132 and through the valve body to the mixing chambers 20 and 44. As the speed and, consequently, the load of the engine picks up the relay 186 closes the circuit to the solenoids 34 and 36 and as the solenoids draw the armature and rod 124 upward the spring 116 through the rod 84 moves the ball away from the seat and water passes downwardly through the control valve into the mixing chambers 20 and 44 where the water is mixed with air entering the chambers through the passage 68.

By this means the water is thoroughly atomized as it is discharged through the nozzles 52.

This action continues until the vacuum pressure builds up sufficiently to draw the rod 84 downwardly through the diaphragm 32. The high vacuum at low and idling speeds holds the diaphragm downwardly so that the ball valve is closed and moisture is not admitted to the intake manifold.

The solenoids may be connected to the system by a conduit 210 and the switch 202 may be positioned on the instrument panel or located at any convenient point.

It will be understood that the successful operation of this system is assured because the regulating screw plugs 50 make it possible to obtain the most efficient mixing of the water and air and the greatest atomization of the water possible. The bores of these screws are enlarged in Figure 8 and it will be understood that they are very small and the sizes thereof are in proportion to the size and type of engine upon which the system is used.

Assuming that the regulating screw plugs are of the proper size and properly installed the screw in the passage 62 regulates the amount of fluid or water entering the mixing chamber 20, the screw plug in the passage 70 governs the amount of air entering the chamber and the plug in the opening 46 governs the amount of admixed water and air being supplied to the fuel mixture through the nozzle 52. The plug in the passage 70 also provides a drain for the mixing chamber 20 whereby water remaining in the chamber is drained off. Furthermore as the bore of the plug is comparatively minute, being smaller than a drop of water, moisture provides a closure therefor, and prevents an over-supply of air being drawn into the intake manifold when it is not desired.

From the foregoing description it is thought to be obvious that a moisture injection system constructed and installed in accordance with my invention is particularly well adapted for use by reason of the convenience and facility with which it may be assembled, installed and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having thus fully described the invention what I claim as new and desire to secure by Letters Patent, is:

1. In a device for injecting moisture into fuel of internal combustion engines, the combination which comprises an intake manifold having a fuel inlet with a flange, carburetors having a flange, a generator actuated by the engine, a plate having openings therethrough and having a flange on an extended edge thereof, said plate positioned between the flanges of the manifold and carburetors and having mixing chambers in the flange thereof, nozzles extended from the mixing chambers of the flange through the plate and into the openings of the part of the plate positioned between the flanges of the manifold and carburetors, said flange of the plate having passages extended from the mixing chambers therein to the atmosphere, a water tank to which the said flange of the plate is attached, a control valve in said water tank, resilient means holding said valve closed, a diaphragm actuated by the vacuum of the intake manifold for preventing opening of the valve with the engine idling, resilient means having greater force than the valve closing means for urging the valve to the open position, and means actuated by current supplied by the said generator for releasing the valve to permit opening thereof by the resilient means with the engine operating under load.

2. In an internal combustion engine fuel conditioner, the combination which comprises a nozzle for use in a conduit between a carburetor and an intake manifold of an engine, means for supplying water to said nozzle, means actuated by the vacuum of the intake manifold for closing the water supplying means with the engine operating at low speed and idling, and solenoid actuated means for opening said water supplying means with the engine operating at normal and high speeds, said water supplying means having an orifice therein opening into the atmosphere for admitting air to water passing to said nozzle.

3. In an internal combustion engine fuel conditioner, the combination which comprises a plate for use between the carburetor and intake manifold flanges of an internal combustion engine, said plate having spaced openings therethrough and passages therein and said passages positioned between side surfaces of the plate, nozzles extended from the ends of the passages into said openings, a water tank positioned at one edge of the plate, said tank having an open chamber in the lower part thereof with passages whereby water passes from the tank to the chamber and from the chamber to the passages of said plate by gravity, a valve positioned between the tank and chamber, a solenoid positioned to open said valve, a diaphragm extended across said chamber sealing the lower part of the chamber from the upper part, means connecting the valve to the diaphragm, a connection extended from the lower part of the chamber for connection to the intake manifold of the engine whereby suction of the manifold retains the valve closed with the engine idling and operating at low speeds, and a connection to the atmosphere for admitting air to the passages extended to the nozzles.

4. In an internal combustion engine fuel conditioner, the combination which comprises a plate for use between the carburetor and intake manifold flanges of an internal combustion engine, said plate having spaced openings therethrough and passages therein extended from said openings to an extended edge and positioned between side surfaces thereof, nozzles extended from the ends of the passages into the openings, said passages having mixing chambers therein and said mixing chambers having openings communicating with the atmosphere, plugs having orifices therethrough positioned in the passages and openings to the atmosphere, said plugs providing communicating means between the mixing chambers and openings and passages and said orifices controlling the areas of the openings and passages, a water tank positioned at the extended edge of the plate, said tank having an open chamber in the lower part with passages extended from the tank to the chamber and from the chamber to the mixing chambers of the plate, a valve positioned to close the passages from the tank to the chamber in the lower part of the tank, a solenoid positioned to open said valve, a diaphragm extended across said open chamber sealing the lower part of the chamber from the upper part, means connecting the valve to the diaphragm, and a connection extended from the lower part of the chamber for connection to the intake manifold of the engine whereby suction of the manifold retains the valve closed with the engine idling and operating at low speeds, said solenoid being adapted to open said valve with the engine operating at normal and high speeds.

References Cited in the file of this patent

UNITED STATES PATENTS

| Number | Name | Date |
|---|---|---|
| 1,397,780 | Pohl | Nov. 22, 1921 |
| 1,622,701 | Brewer | Mar. 29, 1927 |
| 1,702,858 | Bartholomew | Feb. 19, 1929 |
| 1,899,476 | Paine | Feb. 28, 1933 |
| 2,445,337 | Robinson | July 20, 1948 |
| 2,513,773 | Anderson | July 4, 1950 |

OTHER REFERENCES

Alcohol-Water Injection, by Thompson Products, Inc., January 8, 1945, pages 13 and 14.